(12) United States Patent
Jung et al.

(10) Patent No.: US 10,993,189 B2
(45) Date of Patent: Apr. 27, 2021

(54) METHOD AND APPARATUS HAVING POWER CONTROL FOR GRANT-FREE UPLINK TRANSMISSION

(71) Applicant: Lenovo (Singapore) Pte. Ltd., New Tech Park (SG)

(72) Inventors: Hyejung Jung, Northbrook, IL (US); Ebrahim MolavianJazi, Lincolnwood, IL (US); Hossein Bagheri, Urbana, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/278,620

(22) Filed: Feb. 18, 2019

(65) Prior Publication Data

US 2019/0261280 A1 Aug. 22, 2019

Related U.S. Application Data

(60) Provisional application No. 62/631,614, filed on Feb. 16, 2018.

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/242* (2013.01); *H04W 52/346* (2013.01);
(Continued)

(58) Field of Classification Search
CPC .................................................. H04W 52/146
See application file for complete search history.

(56) References Cited

U.S. PATENT DOCUMENTS

| 8,233,419 B2 * | 7/2012 | Peng ................... H04W 52/146 370/311 |
| 2014/0024321 A1 * | 1/2014 | Zhu ......................... H04B 1/18 455/77 |

(Continued)

FOREIGN PATENT DOCUMENTS

| EP | 3413671 A1 | 12/2018 |
| KR | 20170093068 A | 8/2017 |
| WO | 2017197075 A1 | 11/2017 |

OTHER PUBLICATIONS

PCT International Search Report for PCT/IB2019/000159, Lenovo (Singapore) Pte. Ltd., dated Jun. 13, 2019.

(Continued)

*Primary Examiner* — John D Blanton
(74) *Attorney, Agent, or Firm* — Loppnow & Chapa

(57) ABSTRACT

A method and apparatus is provided, wherein configuration information for a transmission is determined based on a configured uplink grant. Information of an assigned one of a plurality of different received by a network entity power levels for each user equipment for a given transmission instance is received. A transmit power offset is determined, based on the received information of the assigned one of the plurality of different received by the network entity power levels. A transmit power for transmission is determined, based on the configuration information of the configured uplink grant and by applying the determined transmit power offset. An uplink transmission is performed using the determined transmit power for transmission.

20 Claims, 9 Drawing Sheets

(51) Int. Cl.
*H04W 52/50* (2009.01)
*H04W 72/12* (2009.01)
*H04W 52/34* (2009.01)
*H04W 52/38* (2009.01)
*H04W 72/14* (2009.01)
*H04W 72/04* (2009.01)
*H04W 52/08* (2009.01)
*H04W 52/10* (2009.01)
*H04W 74/08* (2009.01)

(52) U.S. Cl.
CPC ......... *H04W 52/386* (2013.01); *H04W 52/50* (2013.01); *H04W 72/0473* (2013.01); *H04W 72/1289* (2013.01); *H04W 72/14* (2013.01); *H04W 52/08* (2013.01); *H04W 52/10* (2013.01); *H04W 72/042* (2013.01); *H04W 74/0866* (2013.01)

(56) References Cited

U.S. PATENT DOCUMENTS

| | | | |
|---|---|---|---|
| 2014/0265619 A1* | 9/2014 | Chau | E21B 7/046 307/104 |
| 2015/0016317 A1 | 1/2015 | Park et al. | |
| 2015/0124673 A1 | 5/2015 | Ouchi et al. | |
| 2017/0201950 A1 | 7/2017 | Liu | |
| 2017/0223675 A1 | 8/2017 | Dinan et al. | |
| 2019/0044681 A1 | 2/2019 | Zhang | |
| 2019/0174423 A1 | 6/2019 | Zhang et al. | |
| 2019/0190747 A1 | 6/2019 | Park et al. | |
| 2019/0230600 A1* | 7/2019 | Gao | H04W 52/146 |

OTHER PUBLICATIONS

PCT International Search Report for PCT/IB2019/000168, Lenovo (Singapore) Pte. Ltd., dated Jun. 25, 2019.
LG Electronics, "Discussion on UL transmission without grant", R1-1713189, 3GPP TSG RAN WG1 Meeting #90, Prague, Czech Republic, Aug. 20, 2017.
Talukder, Notice of References Cited, PTO-892, U.S. Appl. No. 16/278,642, U.S. Patent and Trademark Office, dated Oct. 1, 2019.
3GPP TS 38.101-1 V15.0.0 (Dec. 2017), 3rd Generation Partnership Project, Technical Specification Group Radio Access Network; NR; User Equipment (UE) radio transmission and reception; Part 1: Range 1 Standalone (Release 15).
3GPP TS 38.101-2 V15.0.0 (Dec. 2017), 3rd Generation Partnership Project, Technical Specification Group Radio Access Network; NR; User Equipment (UE) radio transmission and reception; Part 2: Range 2 Standalone (Release 15).
3GPP TS 38.212 V15.0.0 (Dec. 2017), 3rd Generation Partnership Project, Technical Specification Group Radio Access Network; NR; Multiplexing and channel coding (Release 15).
3GPP TS 38.213 V15.0.0 (Dec. 2017), 3rd Generation Partnership Project, Technical Specification Group Radio Access Network; NR; Physical layer procedures for control (Release 15).
3GPP TS 38.214 V15.0.0 (Dec. 2017), 3rd Generation Partnership Project, Technical Specification Group Radio Access Network; NR; Physical layer procedures for data (Release 15).

* cited by examiner

METHOD AND APPARATUS HAVING POWER CONTROL FOR GRANT-FREE UPLINK TRANSMISSION

FIELD OF THE INVENTION

The present disclosure is directed to a method and apparatus having power control for grant-free uplink transmission including non-orthogonal multiple access, where as needed one or more user equipment can independently access through a predetermined shared set of time/frequency resources, and/or reference signal parameters available for the uplink of data to the network.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In many instances, communicating with a network can be supported through a dedicated scheduling grant, where as needed, a particular user equipment can contact the network with a request for dedicated resources in support of an uplink transmission. Such a scheduling grant, will often entail a series of back and forth communications sometimes referred to as a handshaking procedure between the user equipment making the request and the network entity, in order to set aside resources in the form of a channel definition including a defined set of time and frequency resources during which the particular user equipment can schedule the requested uplink of information. However depending upon how often the user equipment has information to upload, and the amount of information being communicated when it does, as well as the tolerance for varying degrees of delay associated with the communication(s), the procedures involving a request for dedicated resources may be less than ideal. In some instances, it may be possible to access a shared channel without obtaining prior approval relative to a specific transmission via which one or more user equipment may be able to send information to the network in absence of a dedicated scheduling grant or as part of a grant-free communication. Such a transmission, may be able to avoid the overhead associated with requesting a dedicated grant including the delay in facilitating the potentially multiple back and forth communications that might be related to an affiliated handshaking procedure in establishing the same.

However being a shared space set aside for grant-free communications, there may be instances in which multiple user equipment are interested in sending information to the network via the shared space at the same time. The present inventors have recognized, that by managing the operating power levels associated with the transmission of information via the shared space for multiple user equipment, that access to the shared channel space can be better regulated. In this way, the particular user equipment can implement varying power levels that allow for different ones of the user equipment to be better capable of establishing a connection with the network at different times, even though multiple users may be attempting to simultaneously access the resources associated with the shared space.

SUMMARY

The present application provides a method in a wireless communication device. According to a possible embodiment, the method includes determining configuration information for a transmission based on a configured uplink grant. The method further includes receiving information of an assigned one of a plurality of different received by a network entity power levels for each user equipment for a given transmission instance. A transmit power offset is determined, based on the received information of the assigned one of the plurality of different received by the network entity power levels. A transmit power for transmission is determined, based on the configuration information of the configured uplink grant and by applying the determined transmit power offset. An uplink transmission is performed using the determined transmit power for transmission.

According to a possible embodiment, a user equipment in a communication network is provided. The user equipment includes a controller that determines configuration information for a transmission based on a configured uplink grant. The user equipment further includes a transceiver that receives information of an assigned one of a plurality of different received by a network entity power levels for each user equipment for a given transmission instance. A transmit power offset is determined by the controller based on the received information of the assigned one of the plurality of different received by the network entity power levels, and a transmit power for transmission is determined by the controller, based on the configuration information of the configured uplink grant and by applying by the controller the determined transmit power offset. The transceiver performs an uplink transmission based on the determined transmit power for transmission.

According to a possible embodiment, a method in a network entity is provided. The method includes determining configuration information for a transmission based on a configured uplink grant, and determining a plurality of different received by a network entity power levels for each user equipment for a given transmission instance. Information of an assigned one of the determined plurality of different received by a network entity power levels for a given transmission instance is transmitted to a particular user equipment. A transmit power offset can be determined based on the information of the assigned one of the plurality of different received by the network entity power levels, and a transmit power for transmission can be determined based on the configuration information of the configured uplink grant and by applying the determined transmit power offset. An uplink transmission is received from the particular user equipment based on the determined transmit power for transmission.

According to a possible embodiment, a network entity is provided. The network entity includes a controller that determines configuration information for a transmission based on a configured uplink grant, and determines a plurality of different received by a network entity power levels for each user equipment for a given transmission instance. The network entity further includes a transceiver that transmits information of an assigned one of the determined plurality of different received by a network entity power levels for a given transmission instance to a particular user equipment. A transmit power offset can be determined based on the information of the assigned one of the plurality of different received by the network entity power levels, and a transmit power for transmission can be determined based on the configuration information of the configured uplink grant and by applying the determined transmit power offset. The transceiver receives an uplink transmission from the particular user equipment based on the determined transmit power for transmission.

These and other features, and advantages of the present application are evident from the following description of one or more preferred embodiments, with reference to the accompanying drawings.

DETAILED DESCRIPTION OF THE PREFERRED EMBODIMENT(S)

Figure 1:
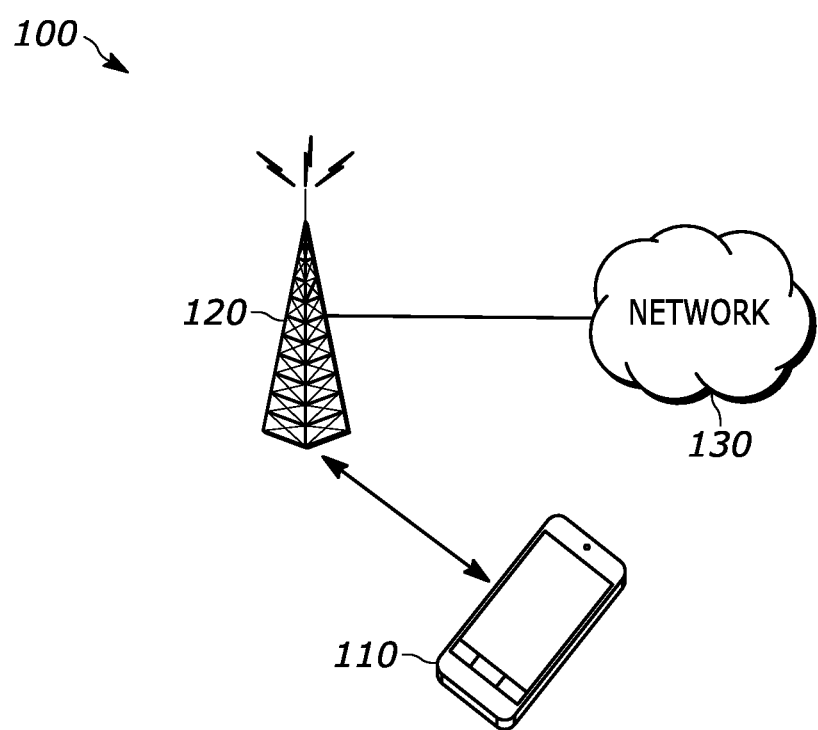
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus having power control for grant-free uplink transmission. Further embodiments provide a method and apparatus having power control for grant-free uplink transmission in the context of multi-beam operation.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Grant-free uplink transmission (i.e. uplink transmission based on a semi-statically configured grant Type 1, or a configured grant Type 2 with some of the parameters configured by higher layers (e.g., radio resource control (RRC)) and some remaining parameters sent in an uplink (UL) Grant physical downlink control channel (PDCCH) activation message) may be beneficial for low-latency uplink transmission and/or for accommodating a large number of expected uplink transmissions within a certain time window with low control signaling overhead. For example, a network entity may configure a UE requiring ultra-reliable low latency communication (URLLC) with a dedicated resource for grant-free UL transmission. In another example, a large number of UEs are configured with a common time and frequency resource for spreading based multiplexing. In grant-free uplink transmission, the UE can be identified by time/frequency resources and/or reference signal (RS) parameters.

A configured grant for physical uplink shared channel (PUSCH) may include power control related parameters, time and frequency resource allocation with periodicity, modulation and coding scheme(s) (MCS), transport block size(s) (TBS), demodulation reference signal (DM RS) related parameters (e.g. DM RS port(s), a bit value for DM RS sequence initialization, the number of DM RS code division multiplexing (CDM) groups), sounding reference signal (SRS) resource indication (alternatively, path-loss reference or beam indication), precoding information and the number of layers, and the frequency offset between two frequency hops (if frequency hopping is configured).

The present application includes methods for the UE to set transmit power for grant-free uplink transmission including non-orthogonal multiple access, when the network entity employs an advanced receiver for demodulation of grant-free uplink transmissions. Further, methods for power control and power headroom report (PHR) under simultaneous multi-beam operation at the UE are disclosed.

A transmit power control (TPC) command can include a UE transmit power correction value transmitted by a network entity for closed-loop power control [3GPP Technical Specification (TS) 38.213]. A group of TPC commands for physical uplink control channel (PUCCH), PUSCH, and/or SRS transmissions by one or more UEs can be included in one downlink control information (DCI) format, for example, DCI Format 2_2 or DCI Format 2_3 as defined in 3GPP new radio (NR) [3GPP TS 38.212].

UEs performing uplink transmission with a configured uplink (UL) grant (i.e. semi-statically configured PUCCH resource and/or PUSCH resource) may be configured to monitor the downlink control information (DCI) format carrying the group of TPC commands for PUSCH and/or PUCCH. In one example, UE is configured with a TPC-PUCCH-radio network temporary identifier (RNTI) (or TPC-PUSCH-RNTI), control resource set(s), respective search space sets, monitoring periodicity, and one or more relevant fields in DCI Format 2_2 for one or more serving cells, in order to receive one or more TPC commands in DCI Format 2_2. Further, Cyclic Redundancy Check (CRC) of the DCI including the group of TPC commands for PUCCH (or PUSCH) can be scrambled by the TPC-PUCCH-RNTI (or TPC-PUSCH-RNTI).

DCI Format 2_2 based group TPC commands can be useful to enable closed-loop power control for grant-free uplink transmission. That is, the network entity can in at least some instances force one or more UEs without monitoring a dynamic UL grant to correct the mismatch between the required transmit power and the actual transmit power in the grant-free uplink transmission, by transmitting one PDCCH including DCI Format 2_2. However, the existing DCI based transmit power adjustment may not be suitable to accommodate systematic power offset among the UEs, wherein the UEs are multiplexed in the same time and frequency radio resource. With the existing Group TPC commands, each TPC command field is associated with one cell. If a TPC command is sent to the UE with the UE-specific PDCCH, the merit of grant-free UL transmission in terms of low-signaling overhead gets lost.

Power Control for Grant-Free Uplink Transmission

In accordance with at least one possible embodiment, if a network entity, e.g. gNodeB (gNB), configures one or more UEs with a common time and frequency radio resource for grant-free uplink transmission, the network entity may employ a successive interference cancellation (SIC) receiver to improve demodulation performances and increase the spectral efficiency. The one or more UEs may be multiplexed in the common time and frequency resource spatially or via one of non-orthogonal multiple access schemes such as sparse code multiple access (SCMA). To maximize potential performance gains from successive interference cancellation, it may be desirable that signals of multiplexed UEs are received with different powers for a given MCS/TBS (additionally, for a given spreading factor and/or a given number of multiplexing codes per UE).

In one embodiment, a UE configured with one or more semi-static transmit resource(s) may receive implicit and/or explicit indication on transmit power offset(s) that the UE has to apply to normative transmit power, wherein the normative transmit power may be set without considering SIC receiver operation at the network entity. In one example, the normative transmit power may be the transmit power setting for a grant-based transmission (e.g., scheduled (and not configured) transmission in response to receiving an UL Grant or hybrid automatic repeat request-negative acknowledgement (HARQ-NACK)) on the transmit resource. For example, the normative PUSCH transmit power $P_{PUSCH,f,c}$ (i,j,$q_d$,l) [3GPP TS 38.213] may be given by $$P_{PUSCH,f,c}(i, j, q_d, l) = \min \begin{Bmatrix} P_{CMAX,f,c}(i), \\ P_{O\_PUSCH,f,c}(j) + \\ 10 \log_{10}(2^\mu \cdot M_{RB,f,c}^{PUSCH}(i)) + \\ \alpha_{f,c}(j) \cdot PL_{f,c}(q_d) + \\ \Delta_{TF,f,c}(i) + f_{f,c}(i, l) \end{Bmatrix} [dBm],$$

wherein the parameters in the above equation are defined in Section 7.1 of 3GPP TS 38.213.

In one example, the indicated transmit power offset(s) is dependent on at least one of MCS/TBS, a spreading factor, and a number of multiplexing codes per UE. In another example, the indicated transmit power offset(s) is dependent on a configured time and frequency resource. In another example, the indicated transmit power offset(s) is dependent on a transmission time interval (TTI) length used for UL transmission: for instance, for slot-based PUSCH transmissions a first transmit power offset(s) is used whereas for mini-slot-based PUSCH transmissions a second transmit power offset(s) is used. In one example, the indicated transmit power offset(s) is dependent on a subcarrier spacing or numerology used for UL transmission.

In another example, the indicated transmit power offset(s) is dependent on a parameter "W" related to amount of (e.g., minimum/average/maximum) overlap between resources configured for different UEs with configured UL grant-free transmissions. "W" may be indicated to the UE e.g., via higher layer signaling e.g., as part of grant-free UL transmission (re)configuration or grant-free UL Type 2 activation DCI or via downlink control signaling or may be derived by the UE based on other parameters. In other examples, a set of transmit power offsets (e.g. {-4, -2, 0, 2, 4} dB) or a sequence of transmit power offsets (e.g. {-3 0 3 3} dB) are indicated, and the UE applies each transmit power offset of the set or sequence cyclically on periodically occurring configured transmit resources. This method provides a certain level of fairness among UEs or allows prioritization of one UE over other UEs, depending on the indicated set or sequence of transmit power offsets. In another example, for configured time and frequency resources larger than a threshold, a first set/sequence of power offset values are used, and for configured time and frequency resources smaller than the threshold, a second set/sequence of power offset values are used. For instance, at least one absolute power offset value in the first set/sequence is smaller than all absolute power offset values in the second set/sequence. For grant-free UL transmissions, a UE may be configured with K repetitions; for instance, a PUSCH is repeated in K consecutive slots/subframes. In a related example to the previous example, the indicated transmit power offset(s) is dependent on a number of repetitions configured for UL transmission of a transport block (TB). In another related example, the transmission power is not changed among the repetitions of a transport block (TB) (i.e., the same transmit power offset is applied to all repetitions of the TB), while in another example, a first transmit power offset is applied to a first subset of repetitions of the TB and a second transmit power offset is applied to a second subset of repetitions of the TB. For instance, the first transmit power offset may be applied to the first half of the repetitions and the second transmit power offset may be applied to the rest of the repetitions. In a related example, the second transmit power offset can be derived from the first transmit power offset. For instance, if the first transmit power offset is a relatively large value, the second transmit power offset is a relatively smaller value. In another example, the UE may skip applying the transmit power offset; for instance, if applying the transmit power offset makes the transmission power smaller than a predefined threshold value; for example, in case of LTE-NR dual connectivity when there is also LTE UL transmission, and the NR UL transmission power is scaled down to allow for LTE transmission. In one example, a first power offset value or a first set/sequence of power offset values are used for a first transmission of a transport block (TB) and a second power offset value or a second set/sequence of power offset values are used for a re-transmission of the transport block. Thus, the set/sequence of power offset values are dependent on whether it is a first transmission of a TB or a retransmission of a TB. In one example set/sequence of power offset values are only applied for a first transmission of a TB, and are not applied for a retransmission of the TB.

In another embodiment, the UE may receive cell-specific transmit power offset configuration for SIC operation at gNB, and may implicitly determine the transmit power offset(s) the UE is to apply to the normative transmit power based on a UE group identity (ID) or a CS-RNTI (configured scheduling RNTI) which the UE is configured with. In one example, $P_{O\_PUSCH,f,c}(j)$ in 3GPP TS 38.213 is defined as a parameter composed of the sum of a component $P_{O\_NOMINAL\_PUSCH,f,c}$ (i) a component $P_{O\_UE\_PUSCH,f,c}(j)$, and a component $P_{O\_UE\_group\_PUSCH,f,c}$ (j) where $j \in \{0, 1, \ldots, J-1\}$ and $P_{O\_UE\_group\_PUSCH,f,c}(j)$ denotes a UE-group specific transmit power offset. gNB may indicate a set (or sequence) of $P_{O\_UE\_group\_PUSCH,f,c}(j)$ values via broadcast signaling, and the UE selects an appropriate $P_{O\_UE\_group\_PUSCH,f,c}(j)$ value from the set (or sequence) of $P_{O\_UE\_group\_PUSCH,f,c}(j)$ values. In another example, $a_{j,f,c}$, in the power control for UL transmission as defined in 3GPP TS 38.213, can be composed of an offset value ($a_0$) signaled by gNB. For instance, gNB may indicate a set (or sequence) of $a_0$ values via broadcast signaling, and the UE selects an appropriate $a_0$ value from the set (or sequence) of $a_0$ values. The selection may be dependent on the UE-group ID and timing information (e.g. slot index, subframe index, and/or frame index) of configured transmit resources. For instance, for a first time index (e.g., slot/mini-slot/subslot index), $P_{O\_UE\_group\_PUSCH,f,c}(j)$ is applied in the power control formula for UL transmission and for a second time index (e.g., slot/mini-slot/subslot index), $P_{O\_UE\_group\_PUSCH,f,c}$ is not applied in the power control formula for UL transmission.

Since the UE can apply transmit power offset based on the pre-defined rule and/or the gNB's configuration, and the gNB is aware of which power offset is applied by a given UE for a given grant-free uplink transmission, the UE can send a power headroom report for normative transmit power (i.e. assuming power offset is set to zero). Based on that, the gNB can derive power headroom for a given transmit power offset and may adjust the transmit power offset configuration based on the UE power headroom. Similarly, as the gNB is aware of which power offset is applied by a given UE for a given grant-free uplink transmission, the gNB can calculate power mismatch between the required received power and the actual received power by taking into account the transmit power offset the UE applied and DCI Format 2_2 based group TPC commands can still be used for closed-loop power control.

In another embodiment, the network may enable/disable applying the transmit power offset e.g., via a downlink control message. This could be helpful, for example, if the network sees many/few retransmissions for different UEs needed because of collision.

In another embodiment, if power headroom reporting is enabled, the UE may indicate the transmit power offset used for the power headroom report (PHR) calculation. Alternatively, PHR is calculated assuming a reference transmit power offset (e.g., 0 dB).

Power Control for Multi-Beam Operation in Grant-Free Uplink Transmission

An antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

In one embodiment, grant-free transmission on PUSCH can be linked to analog and/or hybrid beamforming operation at the gNB and/or the UE, where multiple spatial domain filtering patterns (simply put, beams) can be generated, and either one beam at a time or multiple simultaneous beams can be transmitted and/or received by the UE and/or the gNB. In a first example, for the PUSCH transmission with configured grant (also known as PUSCH transmission with configured grant Type-1 in [TS 38.214]), transmission in different time-frequency resources can occur via different spatial domain transmission filtering patterns or beams, where each UE PUSCH beam for grant-free transmission can correspond to spatial parameters of a reference signal (RS), e.g., a synchronization signal (SS)/physical broadcast channel (PBCH) block or a CSI-RS or an SRS, with different UE PUSCH beams corresponding to spatial parameters of different RSs. The UE can be configured with a spatial relation between an UL transmission (e.g., PUSCH, PUCCH, SRS) and a reference RS such as SSB/PBCH, CSI-RS or an SRS by e.g., higher layers (e.g., RRC or MAC CE). The UE transmits the UL transmission with the same spatial domain transmission filter used for the reception of the SSB/PBCH or CSI-RS, or transmits the UL transmission with the same spatial domain transmission filter used for the transmission of the SRS. In a related example, the resource allocation for configured grant Type-1 also includes an SRS resource indication (SRI) which indicates the PUSCH beam or spatial domain transmission filter to use for grant-free transmission, so that the UE can apply the same spatial domain transmission filter for grant-free PUSCH transmission used for the transmission of the SRS corresponding to the SRI. In a second example, consider a more dynamic version of grant-free transmission, called PUSCH transmission with configured grant Type 2 in [TS 38.214], in which part of the configuration is signaled via higher layers (e.g., RRC) and remaining portion in a UL grant DCI activation message—e.g., the resource allocation follows the higher layer configuration as well as the UL grant received on the activation DCI. In this case, some of the transmission parameters including SRS resource indication (SRI) may not be present in the semi-static configuration but may be indicated in the activation DCI, therefore the UE can be indicated to dynamically change, among other settings, the beam selection or spatial domain transmission filter for the grant-free transmission using the same spatial domain transmission filter used for transmission of the indicated SRS resource corresponding to the SRI in the DCI. Thus, the UE can use SRI to determine the PUSCH beam for grant-free transmission Type-2. In some cases, the higher layer configuration or UL grant may not contain a SRI. For example, if SRI is not included, the UE can determine the PUSCH beam for grant-free transmission Type-2 based on a direct "follow PDCCH" approach, such as, the UE may assume that the spatial relation for PUSCH is given by the Transmission Configuration Indication (TCI) state used for spatial quasi co-located (QCL) indication of the PDCCH carrying the DCI that schedules PUSCH. In another example, if SRI is not included, the UE may assume a spatial relation between the PUSCH transmission and the CORESET (Control Resource Set) DM-RS antenna port associated with PDCCH reception of the UL grant (UL grant activation for grant-free type 2 PUSCH). The DM-RS antenna port may be quasi co-located to SS/PBCH block (e.g., the UE identified during the initial access procedure) or one or more downlink reference signals (DL RS) configured by a transmission configuration indication (TCI) state. The TCI state may be configured by higher layers (e.g., RRC) or be activated by a medium access control-control element (MAC CE) activation message for the CORESET (and PDCCH/search space configured with the CORESET). The UE can transmit the PUSCH transmission using the same spatial domain transmission filter used for reception of the PDCCH UL grant, i.e., by the QCL relationship, used for reception of corresponding SSB/PBCH or reception of the corresponding one or more DL RS indicated by the TCI state.

In one embodiment, beam-specific power control is considered for grant-free transmission with multi-beam operation, so that both Type-1 and Type-2 grant-free transmissions follow beam-specific power control settings, namely, open-loop (OL) parameters, closed-loop (CL) parameters, and pathloss (PL) estimation, e.g., $\{j,q_d,l\}$ indices in the PUSCH power control formula in [TS 38.213] also mentioned earlier in this document, that are potentially different for different PUSCH beams or PUSCH spatial domain transmission filter used for grant-free transmission. The index j corresponds to the jth set of open-loop parameters, index/corresponds to the lth TPC closed loop, and index $q_d$ corresponds to the DL RS resource $q_d$ used for pathloss estimation. In one example, if SRS is configured to the UE, for both configured grant Type-1 and Type-2, an explicit semi-static (i.e., RRC) linkage between SRI and the OL/PL/CL indices $\{j,q_d,l\}$ for power control can be configured to the UE. To reduce complexity and signaling overhead, this semi-static linkage based on SRI for grant-free transmission can be the same as that used for grant-based PUSCH transmission, so that a new configuration is not needed. In a related example, when an SRI is included in the resource allocation for configured grant Type-1 or when an SRI is indicated in the activation DCI for configured grant Type-2, the UE determines the OL/PL/CL indices $\{j,q_d,l\}$ for power control based on the configured/indicated SRI. In another example, if SRS not configured to the UE, for configured grant Type-2, an explicit semi-static (i.e., RRC) linkage between a set of TCI states configured for PDCCH spatial QCL indication and the OL/PL/CL indices $\{j,q_d,l\}$ for power control can be configured to the UE. To reduce complexity and signaling overhead, this semi-static linkage based on TCI states for grant-free transmission can be the same as that used for grant-based PUSCH transmission, so that a new configuration may not be needed. In a related example, when SRI is not included, and a TCI state is indicated for the PDCCH which schedules PUSCH with configured grant Type-2 to indicate the spatial QCL assumption for PDCCH reception, the UE determines the OL/PL/CL indices $\{j,q_d,l\}$ for power control based on the indicated TCI state. In one example, the UE is configured, by higher layers, with a mapping between a set of TCI states and a set of OL/PL/CL indices $\{j,q_d,l\}$ for power control. In another example, the UE is configured, by higher layers, with a mapping between a set of SSB/PBCH block indices and a set of OL/PL/CL indices $\{j,q_d,l\}$ for power control. In one example, the UE is indicated or determines antenna port quasi co-location information of the DM-RS antenna port for PDCCH reception of the UL grant. The UE determines the OL/PL/CL indices $\{j,q_d,l\}$ for power control based on PDCCH DM-RS antenna port quasi co-location information. In one example the DM-RS antenna port may be quasi-collocated to SS/PBCH block (e.g., the UE identified during the initial access procedure) in which case the UE determines the OL/PL/CL indices $\{j,q_d,l\}$ based on the higher layer configured mapping between the set of SSB/PBCH block indices and the OL/PL/CL indices $\{j,q_d,l\}$. In another example, the DM-RS antenna port may be quasi-collocated to one or more DL RS configured by a transmission configuration indication (TCI) state (with the TCI state indicated to the UE), in which case the UE determines the OL/PL/CL indices $\{j,q_d,l\}$ for the indicated TCI state based on the higher layer configured mapping between the set of TCI states and the OL/PL/CL indices $\{j,q_d,l\}$.

Yet, in another example, when only one SRS is configured to the UE, no SRI field will be present in the activation DCI for configured grant Type-2, so gNB may use that as a mechanism to only allow a single PUSCH beam or same spatial PUSCH spatial domain transmission filter used for the SRS transmission, therefore, the power control (PC) parameters can be directly semi-statically configured, i.e., single values for OL/PL/CL indices $\{j,q_d,l\}$ for power control are configured. In a further example, if SRS is not configured to the UE, and if there is only one TCI state configured for PDCCH spatial QCL indication or if TCI state is not present in the DCI that schedules PUSCH, then the PC parameters can be directly semi-statically configured, i.e., single values for OL/PL/CL indices $\{j,q_d,l\}$ for power control are configured. In another example, if SRS is not configured to the UE, and only a single TCI state is configured, then in another example, the DM-RS antenna port may be quasi co-located to one or more DL RS configured by a transmission configuration indication (TCI) state and only a single TCI state is configured, in which case the UE determines the OL/PL/CL indices $\{j,q_d,l\}$ based on the higher layer configured the OL/PL/CL indices $\{j,q_d,l\}$ for the TCI state, e.g., single values for OL/PL/CL indices $\{j,q_d,l\}$ for power control are configured.

PC Parameter Selection for Virtual PUSCH PHR

In one embodiment, when virtual power headroom (PH) is computed and reported for PUSCH in a single-carrier operation or for carrier aggregation (CA) or dual connectivity (DC) operation, e.g., using the following formula in [TS 38.213]

$$PH_{type1,f,c}(i,j,q_d,l) = \tilde{P}_{CMAX,f,c}(i)\{P_{O\_PUSCH,f,c}(j) + \alpha_{f,c}(j) \cdot PL_{f,c}(q_d) + f_{f,c}(i,l)\}$$

where 'j' is the index for open-loop (OL), '$q_d$' is the index for DL RS resource for pathloss estimation, and 'l' is the index for closed-loop (CL) process, there are multiple options for selecting $\{j,q_d,l\}$ for virtual PUSCH PHR:

1) The PC parameter set $\{j,q_d,l\}$ is fixed in the specification. This option may be invalid or inconsistent with the SRI/TCI-based configurations of the PC parameters.
2) The value of OL index j is fixed in the specification, but the other indices $\{q_d,l\}$ are RRC configured. This option may also put restrictions on the choice of $\{q_d,l\}$ due to SRI/TCI-based configurations of the PC parameters.
3) The PC parameter set $\{j,q_d,l\}$ is RRC configured. This give a valid and well-defined option, but may not serve a purpose, since it might correspond to one of the weakest beam pairs for a UE/gNB. One exception is the PC parameter corresponding to grant-free Type-1 transmission, which might still be useful.
4) The PC parameter set $\{j,q_d,l\}$ is simply based on the most recent PUSCH transmission, so no configuration and/or indication is needed. This yields a valid combination and is functionally very desirable, since the PC parameter set is selected dynamically and very likely corresponds to the strongest beam pair for the gNB/UE. However, there is a chance that the UE might miss a grant, so the UE reports virtual PH based on another old PC parameter set (e.g., a wrong beam), which will cause confusion at the gNB and could be detrimental to the role of PHR.

5) The PC parameter set $\{j,q_d,l\}$ is indicated by the UE (along with the PHR itself). This is also a valid option and avoids the confusion between gNB and the UE, since the selected PC parameter set will be explicitly indicated. The fact that UE can dynamically select the PC parameter set might be better than a semi-static choice, but it might not be very useful for the gNB since the selected PC parameter set may or may not be useful for gNB scheduling in view of other UEs being scheduled. The additional downside is that PHR format in MAC-CE will be impacted.

6) The PC parameter set $\{j,q_d,l\}$ is indicated by the gNB in the UL grant that schedules the PHR transmission (or the most recent UL grant before PHR transmission). This is also a valid option with the best functionality since the PC parameter set is selected and indicated dynamically, so the gNB can always make sure it corresponds to the strongest beam pair for the gNB/UE. However, there is a chance the UE might miss a grant, so the UE reports virtual PH based on another old PC parameter set (e.g., a wrong beam), which will cause confusion at the gNB and could be detrimental to the role of PHR. The downside is increased signaling overhead to include this new indication in the DCI for UL grant.

7) A combination of methods (5) and (6) is for the gNB to indicate the PC parameter set $\{j,q_d,l\}$ in the (most recent) UL grant for (/before) PHR transmission, but for the UE to also indicate the PC parameter set $\{\tilde{j},\tilde{q_d},\tilde{l}\}$ that it has actually used to compute the PHR. In this way, the hope is that the UE receives the PC parameter set $\{j,q_d,l\}$ indicated by the gNB and reports the power headroom (PH) accordingly, so that $\{\tilde{j},\tilde{q_d},\tilde{l}\}=\{j,q_d,l\}$, but in the unfortunate case that the UE misses the UL grant and therefore the intended PC parameter set $\{j,q_d,l\}$, the PHR would correspond to some other PC parameter set $\{\tilde{j},\tilde{q_d},\tilde{l}\}\neq\{j,q_d,l\}$, but at least the reported PC parameter set $\{\tilde{j},\tilde{q_d},\tilde{l}\}$ is known to the gNB, so no confusion is made, it might be still somewhat useful. The downside is change to the PHR format in MAC-CE to include the indication for reported PC parameter set, as well as increased signaling overhead to include the indication for desired PC parameter set in the DCI for UL grant.

In one embodiment, in all above cases that include configuration and/or indication, the explicit RRC linkages between PUSCH beam indication (based on SRI or TCI) and the PC parameter set $\{j,q_d,l\}$ can be used to lower the complexity and signaling overhead, i.e., the PC parameter set $\{j,q_d,l\}$ of interest can be simply represented by SRI or TCI using the explicit RRC linkages between the PUSCH beam indication (based on SRI or TCI) and the PC parameter set $\{j,q_d,l\}$.

PHR Triggering Upon a Successful Beam Failure Recovery

In one embodiment, when reporting power headroom (PH) in the case of beam refinement, a PHR triggering based on the LTE/NR condition for significant pathloss change may be maintained and reused, where the current pathloss is estimated based on the pathloss for the existing gNB beam, and the old pathloss refers (i) either to the pathloss of the existing gNB beam if there has been only an incremental and gradual change to the operational beam, (ii) or so the pathloss of the new gNB beam after beam refinement. In either case, the "old/reference" gNB beam and the "new/target" gNB beam for PHR triggering based on PL change are still well-defined, based on the configuration of DL RS resources for PL estimation, i.e., the index $q_d$ in the power control formulas, e.g., in [TS 38.213], and also based on the linkages between PUSCH beam indication (based on SRI or TCI) with the index $q_d$ for DL RS resources for PL estimation, both of which are maintained during a beam refinement procedure at the UE/gNB (such as P2 and P3 beam management procedures).

In one embodiment, when reporting power headroom (PH) in the case of beam failure recovery (BFR) also known as link reconfiguration procedure, a new direct PHR triggering condition based on BFR can be considered, so that PHR is triggered upon a successful beam failure recovery. In this case, the update to the operational gNB/UE beams are significant and fundamental, in that new gNB beams (from the set of candidate new beam for BFR) are reconfigured to comprise the new set of active control beams for a UE. It is expected that, the data beams are also reconfigured in a BFR procedure, such that new DL RS resource are configured for PL estimation, and the linkages between PUSCH beam indication (based on SRI or TCI) with the index $q_d$ are also reconfigured. In such a case, PHR triggering based on PL change may not be very well defined since the association between "old/reference" gNB beam and the "new/target" gNB beam may not be very clear anymore. This issue may be even more critical when considering PHR for simultaneous multi-beam operation. A direct PHR triggering condition based on successful BFR is similar to the PHR triggering condition based on activation of a secondary cell (Scell) or addition of primary cell (PCell), i.e., PHR when new radio link (e.g., cell) is activated/added, which is already supported in both LTE and NR.

Simultaneous Multi-Beam Operation at UE and PHR

In a first implementation/phase of 5G NR specification, such as Rel-15, one consideration is to focus on single beam/panel/TRP transmission and reception at the gNB. Under this assumption, the semi-static configuration might allow multiple active gNB beams and multiple active UE beams, where "active" can mean RRC configured and/or possibly MAC-CE activated for PDSCH, but at each time instance, there is only one operational UE beam for a given gNB, and only one operational gNB beam for a given UE, where for example "operational" can mean indicated by DCI such as via SRI or TCI.

One important aspect of a second implementation/phase for 5G NR specification, such as Rel-16 or beyond, on the other hand, is the introduction of simultaneous multi-beam/panel/TRP operation. In this situation, a UE may be able to simultaneously transmit to the gNB using multiple UE beams, and the gNB may be able to simultaneously receive the UE transmission using multiple gNB beams.

Several example scenarios that enable simultaneous multi-beam operation are as follows:

1) Two UE beams generated by two different UE antenna panels/arrays, and each beam operated or has spatial relation to a different gNB beam from a different gNB TRP (or TRP panel).

2) Two UE beams generated by two different UE antenna panels/arrays, and both beams operated or have spatial relation to the same gNB beam of the same gNB TRP (or TRP panel).

3) A single UE beam is operated or has spatial relation to two different gNB beams from different gNB TRPS (or TRP panels).
4) Each UE transmission carries two different polarizations, and each polarization goes through a different phase shift network, so each transmission includes two UE beams (i.e., one beam for each polarization). The two UE beams may be operated or has spatial relation to the same gNB beam or to different gNB beams.
5) Each UE antenna panel/array equipped with two phase shift networks and/or two power amplifiers (PAs). The two UE beams may be operated or have spatial relation to the same gNB beam or to different gNB beams.

In one example, scenarios (1), (4) and (5) can facilitate both diversity and multiple input multiple output (MIMO) (i.e., spatial multiplexing) operations, but scenarios (2) and (3) can only facilitate diversity operation.

Regarding power control (PC) and PHR for simultaneous multi-beam operation, several aspects should be considered.

In one embodiment, if two simultaneous beams are used in a spatial multiplexing (MIMO) manner, so that some of the layers/antenna ports are carried on one beam and other layers/antenna ports are carried on another beam, antenna-port-specific or antenna-port-group-specific or layer-specific or layer-group-specific power control would be required. In one example, an equal split of power across different layers/antenna ports (as in LTE) is not desirable, since different beams can have different OL/PL/CL parameters and would require separate power allocation.

In one embodiment, corresponding, e.g., to scenario (3) above, a single UE beam is received by two gNB beams at two different TRPs or TRP panels. In one example, the reception status at the gNB, that one gNB beam is receiving the UE UL beam or multiple gNB beams are receiving it, is transparent to the UE. Therefore, there is little room for UE to independently take action in such a situation. On the other hand, the gNB is aware of this situation, and can decide whether to use both gNB beams for the UE reception (e.g., for a cell-edge UE) or to only use one of gNB beam for the UE reception (e.g., for a cell-center UE). In one example, this situation can be handled at the gNB in a semi-static fashion, in that the gNB can configure a larger value of P0 and alpha (to facilitate reception at both gNB beams) or a smaller value of P0 and alpha (to receive at only one gNB beam). In a related example, the gNB can RRC configure which gNB beam (i.e., which DL RS resource) to follow for PL estimation, e.g., the stronger gNB beam to reduce interference or the weaker gNB beam to increase transmission power. In another example, the gNB is able to make the determination on the reception status (e.g., single vs. multiple gNB beam reception) in a dynamic fashion, so that depending on the loading of different TRPs (or TRP panels), location of the UE, and other scheduling factors, the gNB changes the reception status. In a related example, to enable this dynamic functionality, the gNB can RRC configure a baseline OL and PL parameter (e.g., based on only one beam reception using the stronger gNB beam), and then dynamically and possibly in some cases aperiodically indicate a power offset from a set of RRC configured power offset values if the gNB decides to upgrade to the multiple-gNB-beam reception status.

Power control for Scenario (5) without SRS, in case of single gNB beam, the UE can diversity combine the DL RS resource (e.g., SSB/PBCH block, CSI-RS) for path loss estimation and/or spatial relation on the supported two UE beams. The gNB can determine and indicate to the UE whether the UE is configured for diversity combining or for MIMO spatial multiplexing based on angle of arrival (AoA) or location information. The UE can transmit the same signal on both the UE beams providing diversity reception at the gNB.

In one embodiment, if simultaneous multi-beam operation for a UE occurs such that each UE beam is received by a different serving cell, and/or a different frequency component carrier (CC), and/or a different bandwidth part (BWP), and/or a different uplink (regular UL vs. supplementary uplink (SUL)), assuming that operation with multiple active bandwidth parts (BWPs) and/or operation on both regular UL and SUL gets supported in Phase 2 of Release 15, such a simultaneous multi-beam operation can be categorized under the CA/DC transmission, and the already available power control and PHR framework for CA/DC operation with single operational beam is sufficient.

In the following embodiments, simultaneous multi-beam operation is considered when at least two UE beams operate with the same serving cell, same CC/BWP, and same uplink/SUL.

In one example, when the UE transmits [M] beams simultaneously, a number [N] of PC equations and PHRs are necessary, where $1 \le N \le M$. Several examples can be considered as follows:

Alt-1: N=M, i.e., one PC equation for each individual beam power

Alt-2: N=1, i.e., a single PC equation for the sum-power across all beams

Alt-3: $1 \le N \le M$, i.e., several PC equations depending on the situation, one for the sum-power across each "UE beam group" (where the notion of "UE beam group" is discussed below.)

In one example, Alt-1 above has the benefit that transmission power can be very flexibly allocated, but the drawback is that the complexity and signaling overhead at both gNB and the UE side as well as the required specification efforts significantly increases.

In a related example, Alt-2 above is beneficial in that it requires rather lower complexity, overhead, and specification efforts, but the drawback is that it would be harder for the UE to adjust the power interplay across different beam.

Yet in another related example, Alt-3 can balance the flexibility of power allocation across different beams in the face of complexity and signaling overhead at both gNB and the UE side as well as the required specification efforts. In this example, the number [N] of the PC equations is upper bounded by the number of UE antenna panels/subarrays or the number of power amplifiers (PAs). In a related example to this example, the number [N] of the PC equations is tightly related to the number of different gNB beams/panels/TRPs that receive the UE transmission, so even if two different UE panels generate two separate UE beams, but they are received by the same gNB beam/panel/TRP (e.g., example scenario (2) above), then only one PC equation is sufficient, i.e., in this case N=1 for two operational beams, since both UE beams are expected to be configured with the same OL/PL/CL parameters.

In one embodiment, a "UE UL beam group" is composed of all UE beams that correspond to the same DL RS resource for PL estimation, i.e., share the same index $q_d$ in the power control formula [TS 38.213].

In another embodiment, a "UE UL beam group" is composed of all UE beams that correspond to the same "pathloss reference group", i.e., they may correspond to multiple DL RS resources $q_d$ for PL estimation, but those DL RS resources share the same spatial QCL assumptions.

In yet another embodiment, a "UE UL beam group" can be related to other specified notions in 5G such as gNB DL beam groups, or SRS resources/resource sets. In one example, each SRS resource set can correspond to a set/collection of SRS resources that can be simultaneously transmitted. These SRS resources may belong to the SRS resource set for UL non-codebook-based transmission, where up to X SRS resources can be simultaneously transmitted (with X being a UE capability, and X>=2). In another example, these SRS resources may belong to two/multiple SRS resource sets for the UL codebook-based (CB-based) transmission, where only one SRS resource from each SRS resource set can be transmitted at a time. In the latter example, the specification should support the UE to be configured not with only one SRS resource set for UL CB-based transmission (as in 5G NR Phase 1), but needs to be configured with two/multiple SRS resource sets.

In one embodiment, taking as an example the PUSCH power control equation in Phase 1 of NR Rel-15 specification [TS 38.213] with a single operational beam, the updated PUSCH power control equation with two simultaneous beams belonging to two different "UE UL beam groups"/"PL resource groups" is given as follows:

$$P_{PUSCH,f,c}(i, j, q_d, l, b) = \min \begin{Bmatrix} P_{CMAX,b,f,c}(i), \\ 10\log_{10}(2^{\mu(b)} \cdot M_{RB,f,c}^{PUSCH}(i, b)) + \\ P_{O-PUSCH,f,c}(j, b) + \\ \alpha_{f,c}(j, b) \cdot PL_{f,c}(q_d, b) + \\ \Delta_{TF,f,c}(i, b) + f_{f,c}(i, l, b) \end{Bmatrix}$$

along with the constraint that $$\sum_{b=1}^{2} P_{CMAX,b,f,c}(i) \leq P_{CMAX,f,c}(i).$$

However, in at least some instances, this constraint can be relaxed.

In one example, the index b refers to the UE beam group or PL resource group (which, as discussed above, is related to UE transmitting antenna panels/PAs as well as gNB receiving TRPs/TRP panels). In another example, all PC parameters, including OL/PL/CL as well PRB allocation and subcarrier spacing, are expected to be configured/indicated based on the index b.

In yet another example, $P_{CMAX,b,f,c}(i)$ is the configured maximum transmission power for UE-beam-group/PL-resource-group b of carrier f of serving cell c, which is defined in terms of the total radiated power (TRP) or the effective isotropic radiated power (EIRP), and is dependent on the number of antenna elements within the transmitting antenna array/panel and e.g., based on whether RF/PA chains are full-rated or not.

In one embodiment, for setting different power control parameters for different beams, the UE should be configured with two active PDCCHs, so that two DCIs (i.e., two UL grants) can be received, one for each beam, and each DCI/UL grant contains a separate PC parameter set, such as MCS and TPC command.

In one embodiment, for simultaneous multi-beam operation, each beam might carry uplink control information (UCI) with different priority level (e.g., HARQ-ACK, SR, CSI, etc.) or data corresponding to different services (e.g., enhanced mobile broadband (eMBB) or ultra-reliable low latency communication (URLLC)). In one example, although the two beams are operating simultaneously, their transmissions may have different TTI length and subcarrier spacing. In another example, it is possible that the transmissions on the two beams have different starting time and therefore only partially overlap in time.

In one embodiment, if multiple UL transmissions in a simultaneous multi-beam operation lead to a power-limited situation across beams, similar priority rules as in NR CA/DC should be considered among different beams, even if they operate in the same CC/BWP.

In one embodiment, for power headroom reporting (PHR) for simultaneous multi-beam operation, the number of PHRs are the same as the number of UE UL beam groups/PL reference groups. So, e.g., for 2 simultaneous UE beams, either N=1 PHR or N=2 PHRs may be needed. In one example, if two UE beams are linked to the same DL RS resource for PL estimation, then use only one PHR. In another example, if two UE beams are linked to different DL RS resources for PL estimation, then use two PHRs. In yet another example, each PHR will have a corresponding prohibit timer and a corresponding periodic timer, so up to 2 prohibit and up to 2 periodic timers may be needed for 2 simultaneous UE beams. In a further example, if two PHRs are configured due to having two UE UL beam groups, the PHR triggers for each PHR operate independently; e.g., the condition for significant PL change is verified for each PL reference group separately, i.e., the old/reference PL value and the new/target PL value correspond to the same PL reference group.

In one embodiment, within simultaneous multi-beam operation, since one beam may carry PUSCH and another beam may carry PUCCH, a simultaneous PUSCH-PUCCH situation may occur even within the same CC/BWP, therefore a Type-2 PHR may be required.

In one example, if 2 simultaneous UE beams are from the same UE antenna panel, only one PHR may be needed. That is, PHR=P{c,max, antenna panel}-Tx power for UE beam 1-Tx power for UE beam 2.

Priority Rule for Power Scaling/Dropping in Carrier Aggregation and Dual Connectivity One important feature of 5G NR standards is carrier aggregation (CA) or dual connectivity (DC) that provides a framework for the UE to operate with multiple serving cells on multiple component carriers (CCs) or bandwidth parts (BWPs), in order to enhance UE throughput and coverage, and facilitate efficient use of the spectrum, while support various network deployments. A UE operating with CA in NR (NR-CA) or with DC in NR (NR-NR DC, or simply put, NN-DC) needs to support multiple heterogeneous uplink (UL) transmission to different serving cells, e.g., multiplexing of slot based PUSCH, non-slot based PUSCH, long PUCCH, and short PUCCH, and/or same or different subcarrier spacing (SCS) among UL transmissions.

When multiple UL transmissions partially or fully overlap in time, it is possible that the UE becomes power limited, in the sense that for some or all symbols during a transmission duration, the total transmission power across all serving cells exceed the maximum configured total transmission power (Pcmax) for the UE. In this power-limited situation, the UE needs to scale its transmission power or even totally stop/drop one or some of its transmission in one or some CCs/BWPs/serving cells, based on a priority rule among different transmissions, e.g., that specified in [TS 38.213].

In one embodiment, the priority rule for power-scaling/dropping/stopping transmission in a power-limited CA/DC operation shall consider transmission parameters such as transmission length and subcarrier spacing, e.g., different length mini-slot/subslot transmissions as well as the regular slot-based (e.g., 1 ms in LTE/NR) transmission, and also different subcarrier spacing options. In one example, higher layers at the UE map logical channels/signals with different priority levels to physical logical channels/signals with different transmission parameters, such as URLLC. In another example, higher layers at the UE map data corresponding to different services with different reliability and/or latency requirements to physical logical channels/signals with different transmission parameters. In a first example, the priority rule among different transmissions in a power-limited CA/DC operation shall assign a higher priority for shorter TTI over longer TTI. In a related example, transmission on mini-slot/subslot is prioritized over transmission on regular slot. In another related example, transmission on a shorter mini-slot/subslot is prioritized over transmission on a longer mini-slot/subslot. In a second example, the priority rule among different transmissions in a power-limited CA/DC operation shall assign a higher priority for larger subcarrier spacing over smaller subcarrier spacing. In yet another example, the aforementioned prioritization rules based on transmission TTI length and/or subcarrier spacing shall be supported within each priority level for a set of channels/signals (e.g., PRACH, PUSCH/PUCCH with HARQ-ACK, PUSCH/PUCCH with SR, PUSCH/PUCCH with CSI, PUSCH without UCI, SRS) in a power-limited CA/DC operation.

In one embodiment, the priority rule for power-scaling/dropping/stopping transmission in a power-limited CA/DC operation shall support a high priority for PRACH on a primary small cell (PSCell) based on its functionality. In one example, when PRACH on PSCell is used in the link reconfiguration (a.k.a., beam failure recovery) procedure, to send beam failure indication and new candidate beam identification messages, the transmission of PRACH on PSCell shall be prioritized over PUSCH/PUCCH with SR or with CSI for any serving cell, and also prioritized over PUSCH/PUCCH with HARQ-ACK on serving cells in the secondary cell group (SCG). In some examples, the PRACH on PSCell may also be prioritized even over PUSCH/PUCCH with HARQ-ACK on serving cells in the master cell group (MCG) except for the primary cell (PCell). In another example, when PRACH on PSCell is used in random access procedure, to re-acquire time synchronization when the UE is assumed to have lost synchronization with PSCell (e.g., inactivity on the uplink) such as when the UE receives a PDCCH order to transmit PRACH, the transmission of PRACH on PSCell shall be prioritized over PUSCH/PUCCH with SR or with CSI for any serving cell, and also prioritized over PUSCH/PUCCH with HARQ-ACK on serving cells in the secondary cell group (SCG). In some examples, the PRACH on PSCell may also be prioritized even over PUSCH/PUCCH with HARQ-ACK on serving cells in the master cell group (MCG) except for the primary cell (PCell).

Timing Aspect of Power Control for Grant-Free/SPS Uplink Transmission

In LTE, for shortened transmission time interval (sTTI) operation (in which a TTI length less than a 1 ms-subframe is used for shortened TTI operation e.g., sPDSCH (DL data), sPUSCH (UL data), sPDCCH containing sDCI (DL control information for sTTI operation) etc.), the following is agreed for semi-persistent scheduling (SPS) operation:

The TPC in DCI format 3/3A is considered in the power control of sPUCCH corresponding to SPS-sPDSCH/SPS-sPUSCH in SPS operation. The power control loop for SPS is not impacted by the UL/DL sDCI. The power control loop for non-SPS is not impacted by DCI format 3/3A.

The TPC-index for DCI format 3/3A is separately configured by RRC as part of the SPS configuration (i.e. TPC-PDCCH-config 1E) for sTTI and TTI.

The processing timing of DCI format 3/3A in sTTI operation is according to legacy n+4 subframe processing timeline.

Figure 2:
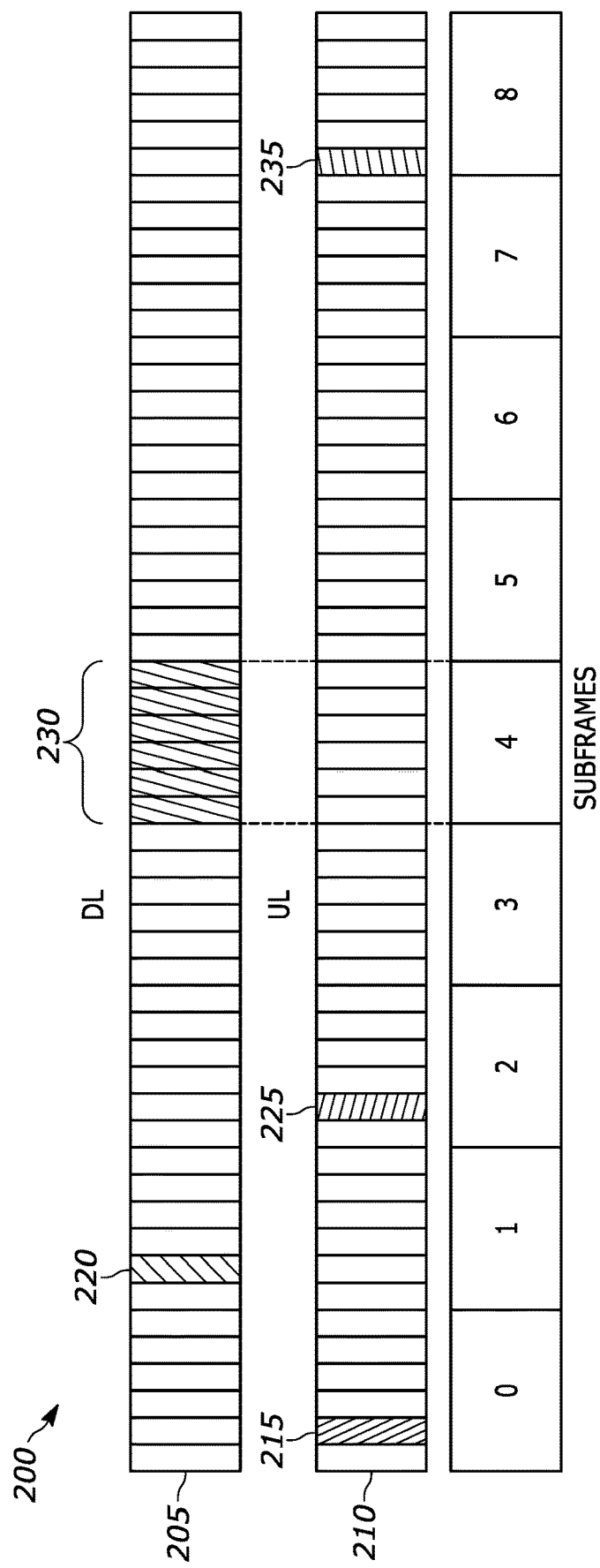
FIG. 2 is a subframe processing timeline including power control signaling for updating the transmission power for an exemplary uplink transmission via each of a downlink and an uplink channel.

Updating the transmission power for semi-persistent scheduling (SPS) UL transmissions based on DCI format 3/3A with n+4 subframe processing timeline only can lead to significant resource inefficiency, especially if the SPS periodicity of SPS occasions is small (such as one SPS occasion every sTTI or every few sTTI). FIG. 2 illustrates a subframe processing timeline 200 including power control signaling for updating the transmission power for an exemplary uplink transmission via each of a downlink channel 205 and an uplink channel 210. For example, in FIG. 2: SPS periodicity is 1 sTTI (i.e., every UL sTTI is a SPS occasion), if a PHR is triggered (e.g., due to a significant pathloss change) in an UL sTTI 215, where sPUSCH is scheduled by dynamic grant, the UE may receive a TPC command in a later DL sTTI 220 assuming n+6 sTTI processing timeline. In such a situation waiting for the network to send another DCI 3/3A with n+4 subframe timing (leading to DCI 3/3A sent in subframe 4 230 and the command can be applied to UL sTTI 235 could cause significant resource inefficiency; whereas if the UE adjusts its SPS UL transmission power taking into account the TPC command sent in sTTI 220 with sTTI processing timeline of n+6 sTTI, correct UL transmission power can be used from UL SPS occasion 225; i.e., applying the correct transmit power almost 35 sTTI SPS occasion sooner.

In a first embodiment, upon transmission of a triggered PHR in an sTTI, and reception of a first TPC command after the reported PHR and after elapsing the sTTI processing timeline, the transmit power for SPS occasions adjusted taking into account the TPC command.

Figure 3:
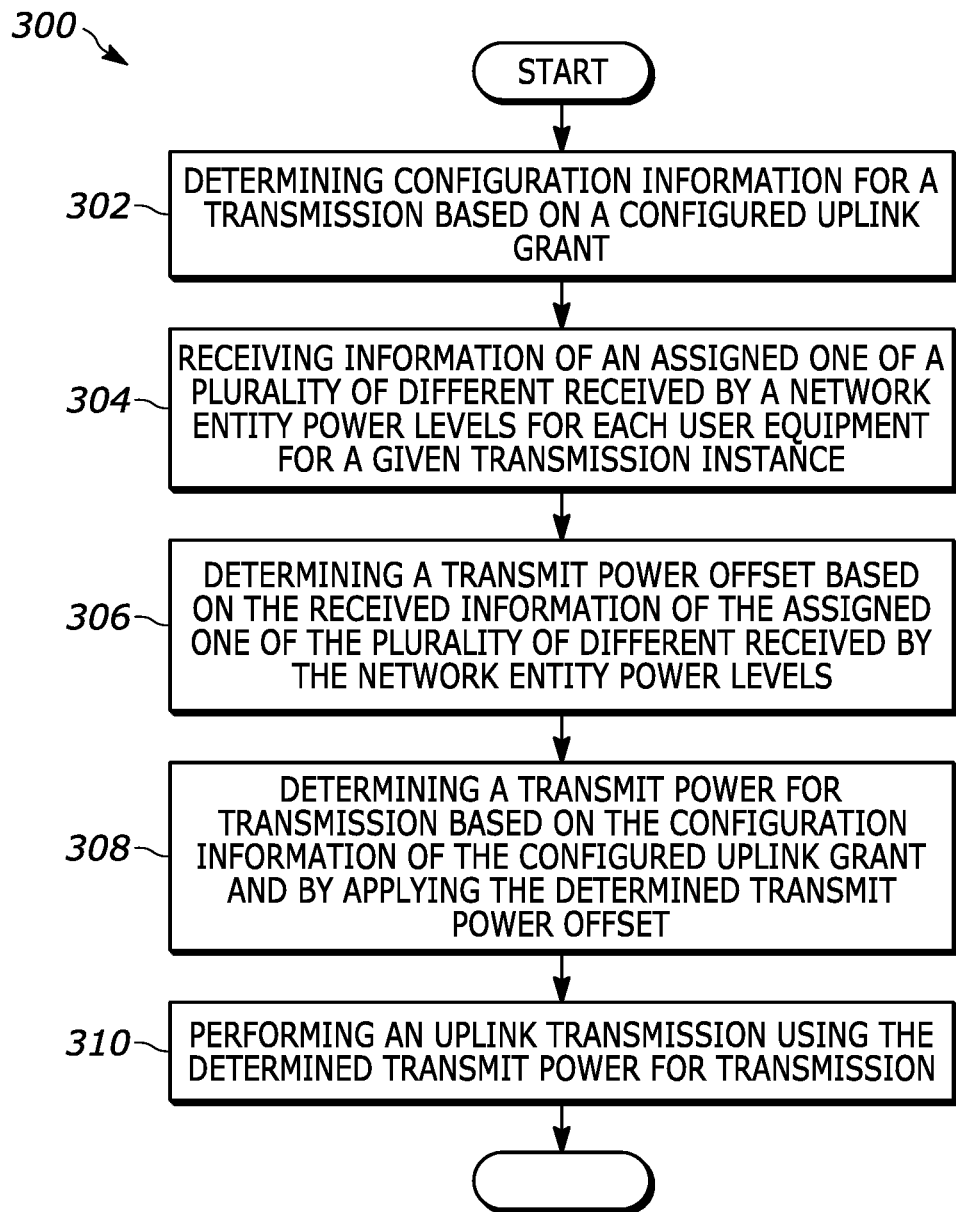
FIG. 3 is a flow diagram in a user equipment for power control for grant-free uplink transmission.

FIG. 3 illustrates a flow diagram 300 in a user equipment for power control for grant-free uplink transmission, in accordance with at least one embodiment. The method represented in the flow diagram includes determining 302 configuration information for a transmission based on a configured uplink grant. Information of an assigned one of a plurality of different received by a network entity power levels for each user equipment for a given transmission instance is received 304. A transmit power offset is determined 306, based on the received information of the assigned one of the plurality of different received by the network entity power levels, and a transmit power for transmission is determined 308, based on the configuration information of the configured uplink grant and by applying the determined transmit power offset. An uplink transmission using the determined transmit power for transmission is performed 310.

In at least some instances, determining the transmit power offset comprises identifying a transmit power offset included in the received information of an assigned one of the plurality of different received by the network entity power levels for each user equipment for the given transmission instance.

In at least some instances, the transmit power offset is dependent on at least one of a modulation and coding scheme, a transport block size, a spreading factor, and a number of multiplexing codes per user equipment.

In at least some instances, the transmit power offset is dependent on a configured time and frequency resource. In some of these instances, the configured time and frequency resource is for a grant free uplink transmission, which is shared with one or more other user equipment.

In at least some instances, the transmit power offset is dependent on a transmission time interval length used for the uplink transmission.

In at least some instances, receiving the information of the transmit power offset includes a sequence of transmit power offsets, where each transmit power offset in the sequence of transmit power offsets is applied sequentially and cyclically on periodically occurring configured transmit resources. In some of these instances, at least one transmit power offset in the sequence of transmit power offsets is repeated. In other of these instances, all transmit power offsets in the sequence of transmit power offsets are distinct. In still further other of these instances, each transmit power offset in the sequence of transmit power offsets is applied to a respective subset of repetitions of a transport block of the uplink transmission.

In at least some instances, the transmit power offset of the received information is user equipment-specifically signaled by the network entity.

In at least some instances, the transmit power offset of the received information is cell-specifically signaled by the network entity.

In at least some instances, the method represented in the flow diagram can further include determining the transmit power offset based on a user equipment group identity with which the user equipment is configured.

Figure 4:
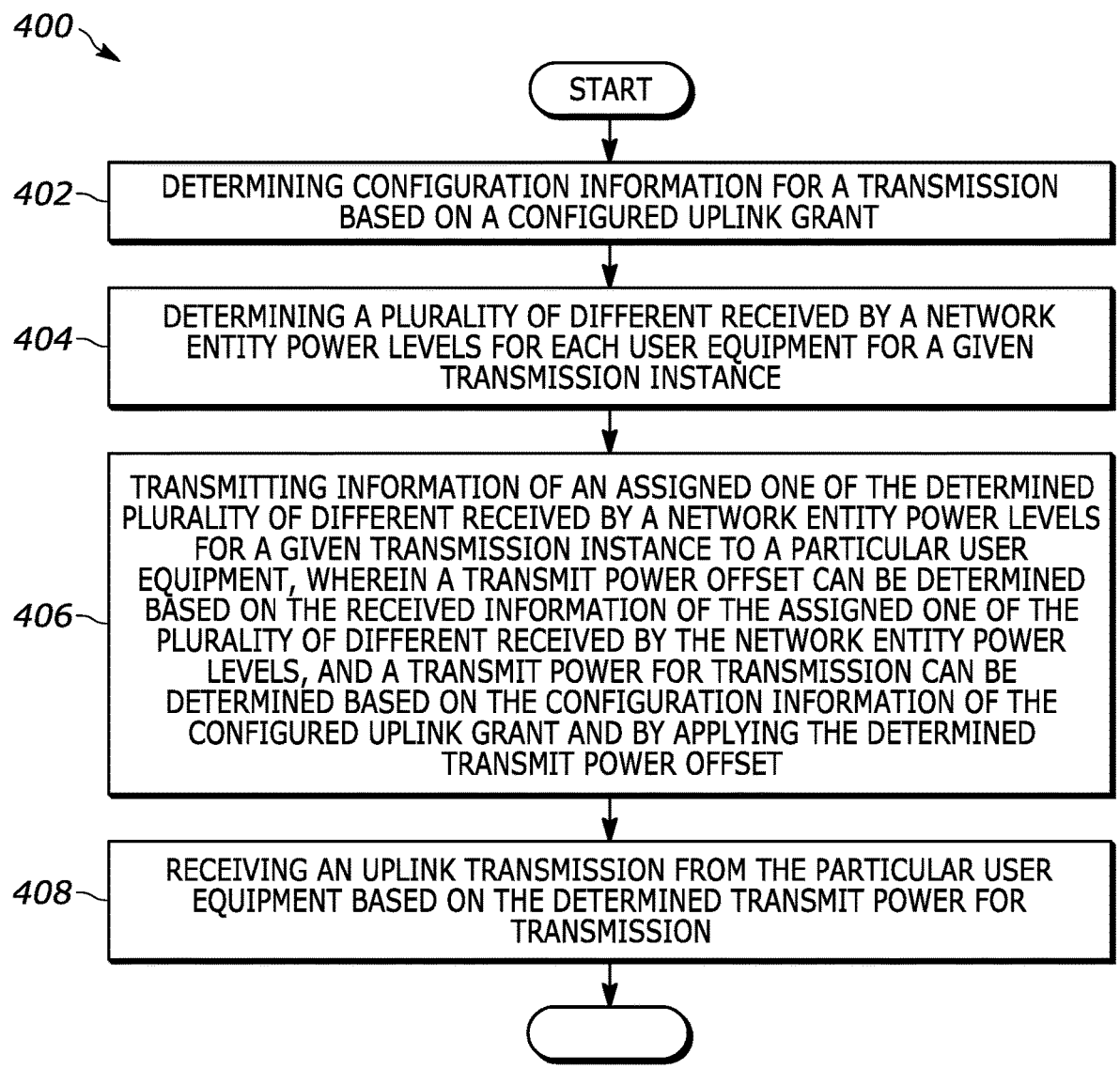
FIG. 4 is a flow diagram in a network entity for power control for grant-free uplink transmission.

FIG. 4 illustrates a flow diagram 400 in a network entity for power control for grant-free uplink transmission. The method represented in the flow diagram includes determining 402 configuration information for a transmission based on a configured uplink grant, and determining 404 a plurality of different received by a network entity power levels for each user equipment for a given transmission instance. The method further includes transmitting 406 information of an assigned one of the determined plurality of different received by a network entity power levels for a given transmission instance to a particular user equipment, wherein a transmit power offset can be determined based on the information of the assigned one of the plurality of different received by the network entity power levels, and a transmit power for transmission can be determined based on the configuration information of the configured uplink grant and by applying the determined transmit power offset, and an uplink transmission is received 408 from the particular user equipment based on the determined transmit power for transmission.

Figure 5:
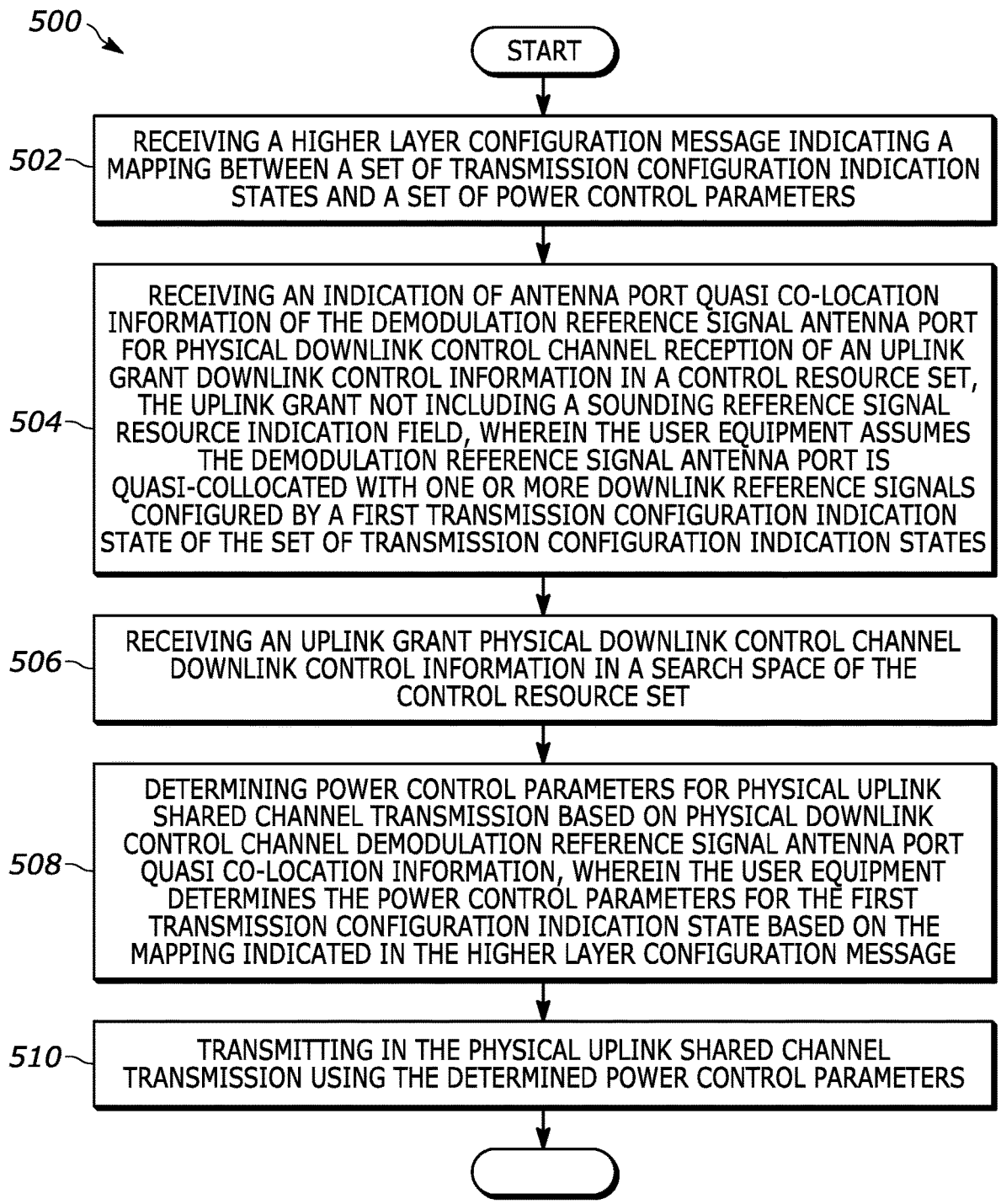
FIG. 5 is a flow diagram in a user equipment for power control for multi-beam operation.

FIG. 5 illustrates a flow diagram 500 in a user equipment for power control for multi-beam operation. The method represented in the flow diagram includes receiving 502 a higher layer configuration message indicating a mapping between a set of transmission configuration indication states and a set of power control parameters. An indication of antenna port quasi co-location information is received 504 of the demodulation reference signal antenna port for physical downlink control channel reception of an uplink grant downlink control information in a control resource set, the uplink grant not including a sounding reference signal resource indication field, wherein the user equipment assumes the demodulation reference signal antenna port is quasi-collocated with one or more downlink reference signals configured by a first transmission configuration indication state of the set of transmission configuration indication states. An uplink grant physical downlink control channel downlink control information is received 506 in a search space of the control resource set. The method represented in the flow diagram 500 further includes determining 508 power control parameters for physical uplink shared channel transmission based on physical downlink control channel demodulation reference signal antenna port quasi co-location information, wherein the user equipment determines the power control parameters for the first transmission configuration indication state based on the mapping indicated in the higher layer configuration message. The method represented in the flow diagram 500 still further includes transmitting 510 in the physical uplink shared channel transmission using the determined power control parameters.

In at least some instances, the power control parameters include one or more of open-loop parameter indexes, transmit power control closed-loop indexes, path loss reference signal indexes.

In at least some instances, the first transmission configuration indication state is indicated to the user equipment by higher layer messaging. In some of these instances, medium access control-control elements can indicate the first transmission configuration indication state which provides the quasi co-location information for the control resource set comprising the uplink grant physical downlink control channel downlink control information.

In at least some instances, the uplink grant downlink control information is an uplink downlink control information activation message for a configured grant Type-2 physical uplink shared channel transmission.

In at least some instances, the method represented in the flow diagram can further include transmitting the physical uplink shared channel transmission using the same spatial domain transmission filter used for reception of the physical downlink control channel uplink grant.

In at least some instances, the method represented in the flow diagram can further include transmitting the physical uplink shared channel transmission using the same spatial domain transmission filter used for reception of one or more downlink reference signal indicated by the first transmission configuration indication state.

In at least some instances, when there is only a single transmission configuration indication state configured for physical downlink control channel spatial quasi co-location indication or if a transmission configuration indication state is not present in the downlink control information that schedules physical uplink shared channel transmissions, then the power control parameters are directly semi-statically configured. In some of these instances, semi-statically configuring power control parameters can include configuring single values for one or more of an open loop parameter index, a closed loop index, and a path loss index.

In accordance with a further embodiment, there is a further method in a user equipment. The further method can include receiving a higher layer configuration message indicating a mapping between a set of SSB/PBCH block indices and a set of power control parameters. A first SSB/PBCH block is identified from the set of SSB/PBCH blocks based on an initial access cell detection procedure. An antenna port quasi co-location information of the DM-RS antenna port is determined for PDCCH reception of a UL DCI in a CORESET based on the identified first SSB/PBCH block, wherein the UL grant not including a SRS Resource Indication field, and the UE assumes the DM-RS antenna port is quasi-collocated to the first SSB/PBCH block. An UL grant PDCCH DCI is received in a search space of the CORESET. The power control parameters for PUSCH transmission are determined, based on PDCCH DM-RS antenna port quasi co-location information, wherein the UE determines the power control parameters for the first SSB/PBCH block based on the higher layer configured mapping. The PUSCH transmission is transmitted using the determined power control parameters.

In at least some instances, the power control parameters include one or more of open-loop parameters (such as Po, alpha) (indicated by the index j), TPC closed-loop index (l), pathloss RS index (q).

In at least some instances, the UL grant DCI is a UL DCI activation message for a configured Type-2 PUSCH transmission.

In at least some instances, the method can further include transmitting the PUSCH transmission using the same spatial domain transmission filter used for reception of the PDCCH UL grant.

In at least some instances, the method can further include transmitting the PUSCH transmission using the same spatial domain transmission filter used for reception of the first SSB/PBCH block.

In accordance with a further embodiment, there is a further method in a user equipment. The further method can include receiving an UL grant for SPS UL transmissions based on a $1^{st}$ TTI length, allocating plurality of SPS occasions wherein each SPS occasion, an SPS-related UL transmission can occur. The method further includes receiving a first DL DCI containing transmission power control command (TPC) associated with a first processing timeline; wherein the TPC is applicable to UL transmissions not sooner than a first time period; wherein the first time period is determined based on the $1^{st}$ processing timeline, and receiving a $2^{nd}$ DL DCI containing TPC associated with a $2^{nd}$ processing timeline; wherein the TPC is applicable to UL transmissions not sooner than a $2^{nd}$ time period; wherein the $2^{nd}$ time period is determined based on the $2^{nd}$ processing timeline. The $1^{st}$ processing timeline is shorter than the $2^{nd}$ processing timeline. UL transmission power is adjusted for a first SPS occasion based on a TPC command derived from the $2^{nd}$ DL DCL. UL transmission power is adjusted for a $2^{nd}$ SPS occasion based on at least a TPC command derived from the $1^{st}$ DL DCL. The first DL DCI is received later than the $2^{nd}$ DL DCI. The $1^{st}$ DL DCI is received no later than the first time period of the $2^{nd}$ SPS occasion. The $2^{nd}$ SPS occasion occurs after the $1^{st}$ SPS occasion but not later than first time period after the $1^{st}$ SPS occasion.

In at least some instances, a power headroom report (PHR) is transmitted in an UL TTI of a first TTI length between the $1^{st}$ and $2^{nd}$ SPS occasions. In some of these instances, the $1^{st}$ DL DCI can be received after transmission of the PHR, but not later than the first time period.

In at least some instances, the UL transmission power for a $2^{nd}$ SPS occasion is adjusted based on the TPC command derived from the $1^{st}$ DL DCL and the TPC command derived from the $2^{nd}$ DL DCL. In some of these instances, resource allocated to UL transmissions can be associated with the $1^{st}$ DL DCI and $2^{nd}$ DL DCI is taken into account in adjusting the UL transmission power for a $2^{nd}$ SPS occasion.

Figure 6:
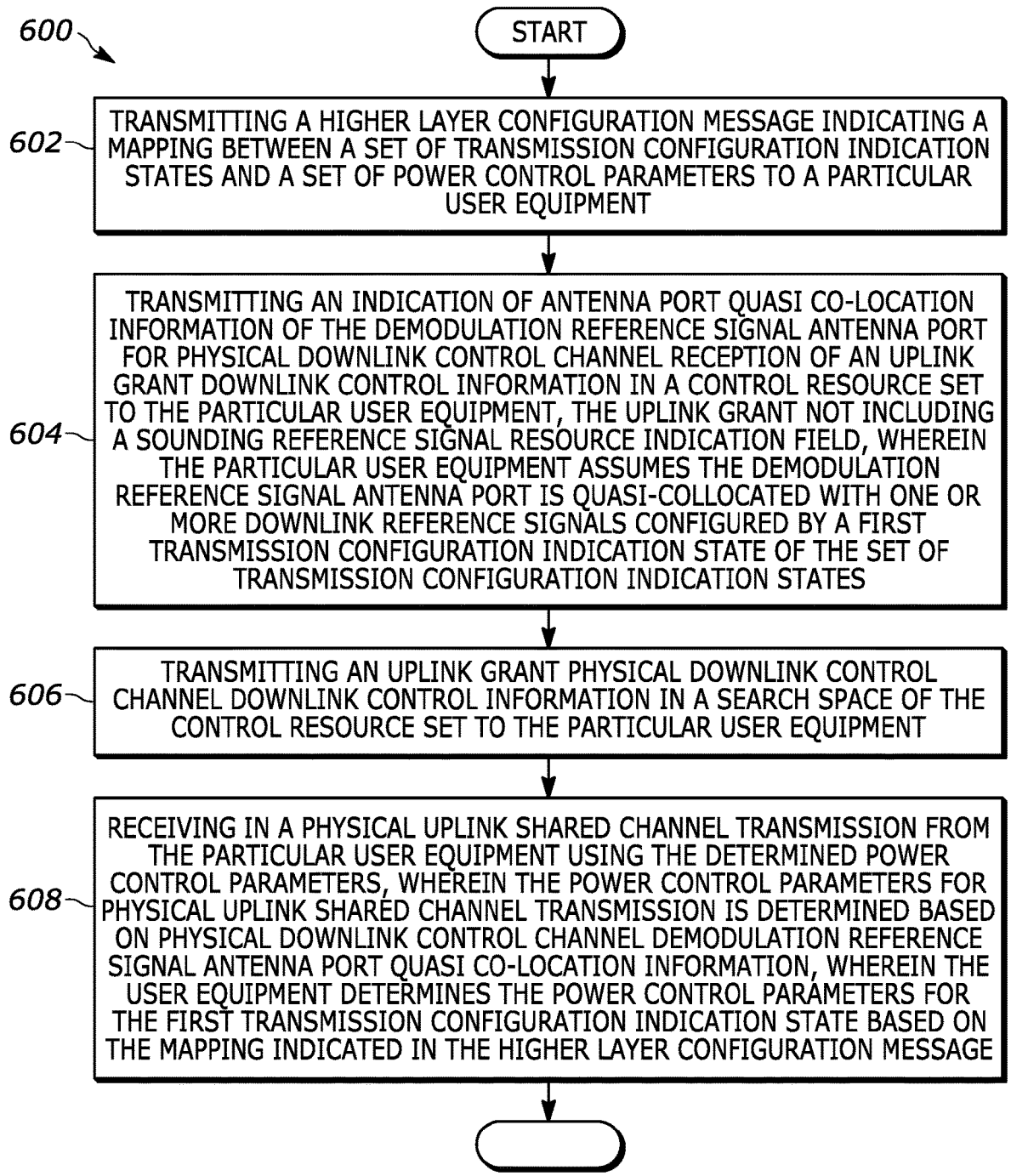
FIG. 6 is a flow diagram in a network entity for multi-beam operation.

FIG. 6 illustrates a flow diagram 600 in a network entity for multi-beam operation. The method represented in the flow diagram includes transmitting 602 a higher layer configuration message indicating a mapping between a set of transmission configuration indication states and a set of power control parameters to a particular user equipment. An indication of antenna port quasi co-location information of the demodulation reference signal antenna port is transmitted 604 for physical downlink control channel reception of an uplink grant downlink control information in a control resource set to the particular user equipment, the uplink grant not including a sounding reference signal resource indication field, wherein the particular user equipment assumes the demodulation reference signal antenna port is quasi-collocated with one or more downlink reference signals configured by a first transmission configuration indication state of the set of transmission configuration indication states. An uplink grant physical downlink control channel downlink control information is transmitted 606 in a search space of the control resource set to the particular user equipment. The method represented in the flow diagram 600 further includes receiving 608 in a physical uplink shared channel transmission from the particular user equipment using the determined power control parameters, wherein the power control parameters for physical uplink shared channel transmission is determined based on physical downlink control channel demodulation reference signal antenna port quasi co-location information, wherein the user equipment determines the power control parameters for the first transmission configuration indication state based on the mapping indicated in the higher layer configuration message.

Figure 7:
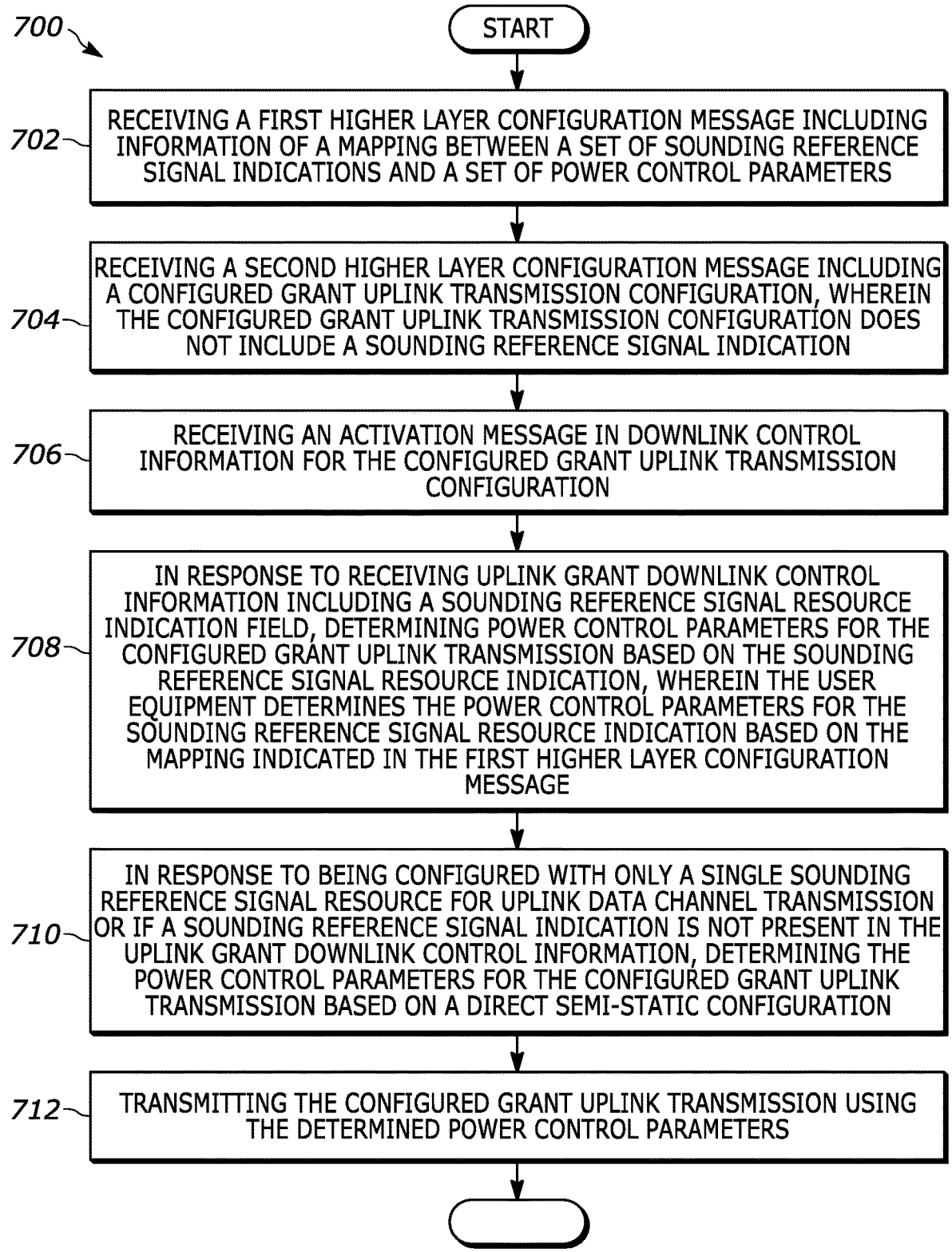
FIG. 7 is a further flow diagram in a user equipment for power control for multi-beam operation in grant-free uplink transmission.

FIG. 7 illustrates a further flow diagram 700 in a user equipment for power control for multi-beam operation in grant-free uplink transmission. The method represented in the flow diagram includes receiving 702 a first higher layer configuration message including information of a mapping between a set of sounding reference signal indications and a set of power control parameters, when the user equipment is configured with more than one sounding reference signal resource for uplink data channel transmission. A second higher layer configuration message including a configured grant uplink transmission configuration is received 704, wherein the configured grant uplink transmission configuration does not include a sounding reference signal indication. An activation message is received 706 in downlink control information for the configured grant uplink transmission configuration. In response to receiving uplink grant downlink control information including a sounding reference signal resource indication field, power control parameters are determined 708 for the configured grant uplink transmission based on the sounding reference signal resource indication, wherein the user equipment determines the power control parameters for the sounding reference signal resource indication based on the mapping indicated in the first higher layer configuration message. In response to being configured with only a single sounding reference signal resource for uplink data channel transmission or if a sounding reference signal indication is not present in the uplink grant downlink control information, the power control parameters for the configured grant uplink transmission are determined 710 based on a direct semi-static configuration. The configured grant uplink transmission is transmitted 712 using the determined power control parameters.

In at least some instances, the power control parameters include one or more of open-loop parameter indexes, transmit power control closed-loop indexes, path loss reference signal indexes.

In at least some instances, the direct semi-statically configuration based power control parameters includes configuring single values for one or more of an open loop parameter index, a closed loop index, and a path loss reference signal index.

In at least some instances, the mapping indicated in the first higher layer configuration message is the same as a second mapping in a third higher layer configuration message between a set of sounding reference signal indications and a set of power control parameters for dynamically scheduled physical uplink shared channel transmissions.

In at least some instances, a configured grant uplink transmission is a configured grant Type-2 physical uplink shared channel transmission.

Figure 8:
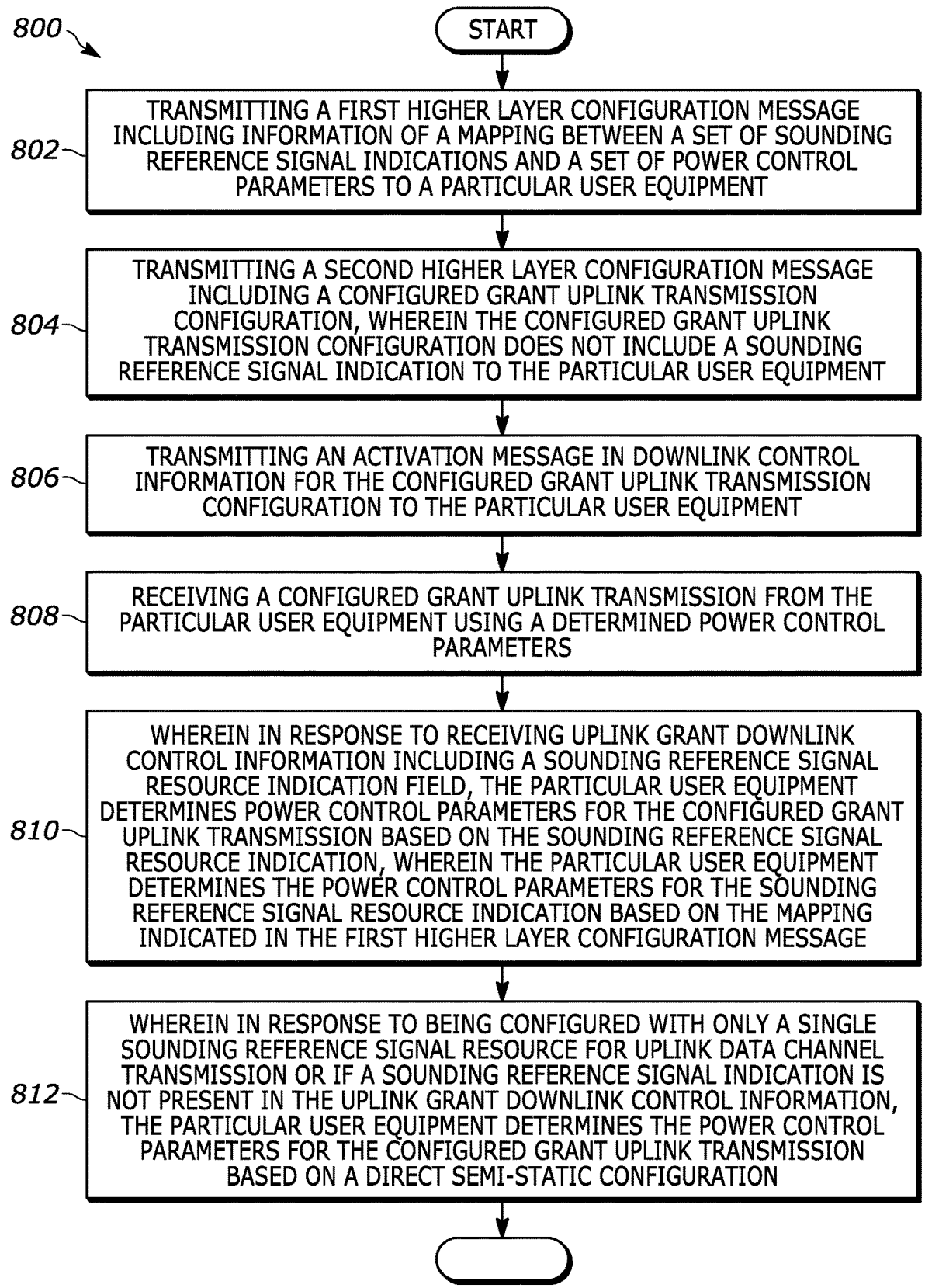
FIG. 8 is a further flow diagram in a network entity for multi-beam operation in grant-free uplink transmission.

FIG. 8 illustrates a further flow diagram 800 in a network entity for multi-beam operation in grant-free uplink transmission. The method represented in the flow diagram includes transmitting 802 a first higher layer configuration message including information of a mapping between a set of sounding reference signal indications and a set of power control parameters to a particular user equipment, when the user equipment is configured with more than one sounding reference signal resource for uplink data channel transmission. A second higher layer configuration message including a configured grant uplink transmission configuration is transmitted 804, wherein the configured grant uplink transmission configuration does not include a sounding reference signal indication to the particular user equipment. An activation message is transmitted 806 in downlink control information for the configured grant uplink transmission configuration to the particular user equipment. A configured grant uplink transmission is received 808 from the particular user equipment using a determined power control parameters. In response to receiving uplink grant downlink control information including a sounding reference signal resource indication field, the particular user equipment determines 810 power control parameters for the configured grant uplink transmission based on the sounding reference signal resource indication, wherein the particular user equipment determines the power control parameters for the sounding reference signal resource indication based on the mapping indicated in the first higher layer configuration message. In response to being configured with only a single sounding reference signal resource for uplink data channel transmission or if a sounding reference signal indication is not present in the uplink grant downlink control information, the particular user equipment determines 812 the power control parameters for the configured grant uplink transmission based on a direct semi-static configuration.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
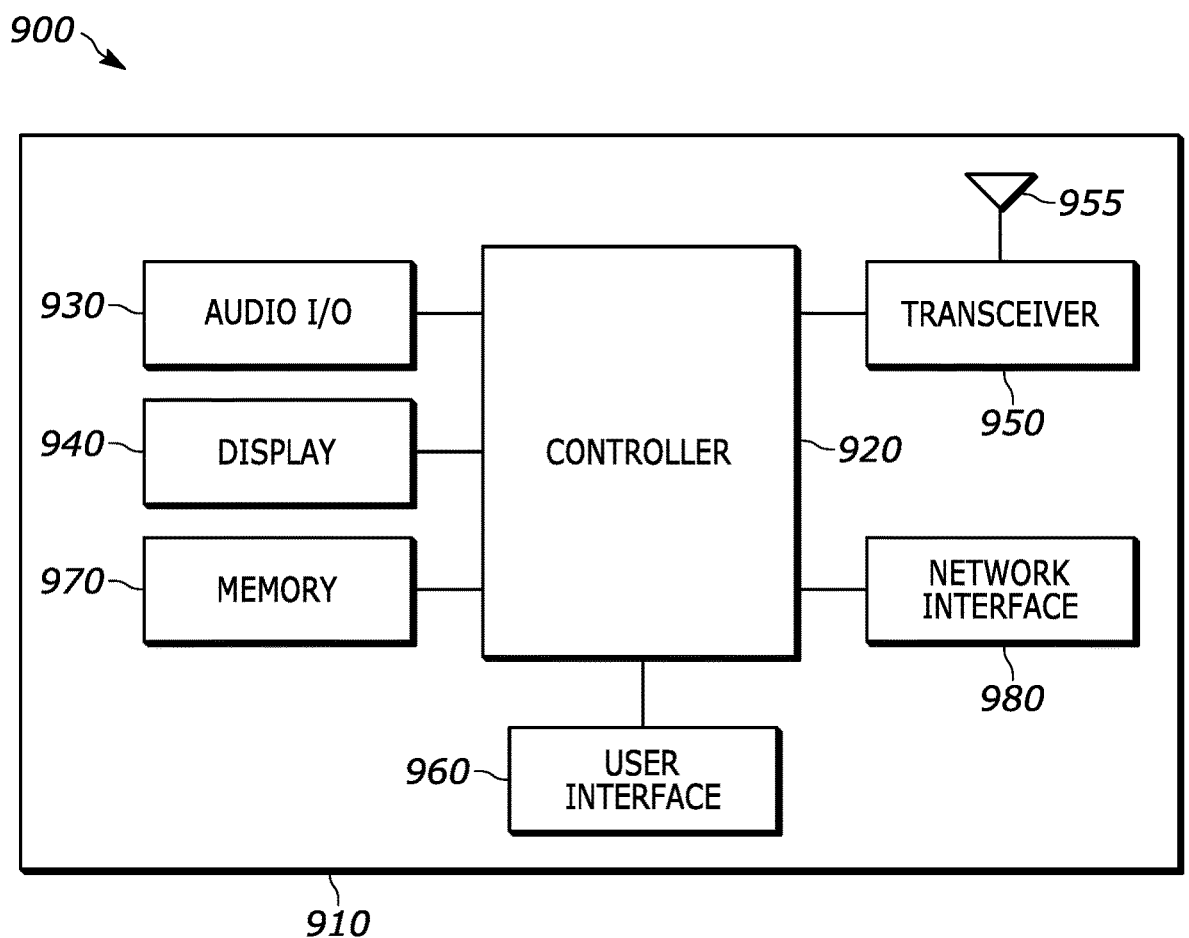
FIG. 9 is an example block diagram of an apparatus according to a possible embodiment.

FIG. 9 is an example block diagram of an apparatus 900, such as the wireless communication device 110, according to a possible embodiment. The apparatus 900 can include a housing 910, a controller 920 within the housing 910, audio input and output circuitry 930 coupled to the controller 920, a display 940 coupled to the controller 920, a transceiver 950 coupled to the controller 920, an antenna 955 coupled to the transceiver 950, a user interface 960 coupled to the controller 920, a memory 970 coupled to the controller 920, and a network interface 980 coupled to the controller 920. The apparatus 900 can perform the methods described in all the embodiments The display 940 can be a viewfinder, a liquid crystal display (LCD), a light emitting diode (LED) display, a plasma display, a projection display, a touch screen, or any other device that displays information. The transceiver 950 can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 970 can include a random access memory, a read only memory, an optical memory, a solid state memory, a flash memory, a removable memory, a hard drive, a cache, or any other memory that can be coupled to an apparatus.

The apparatus 900 or the controller 920 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 970 or elsewhere on the apparatus 900. The apparatus 900 or the controller 920 may also use hardware to implement disclosed operations. For example, the controller 920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first", "second", and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment, the method comprising:
determining configuration information for a transmission based on a configured uplink grant;
receiving information of an assigned one of a plurality of different received by a network entity power levels for each user equipment for a given transmission instance;
determining a transmit power offset based on the received information of the assigned one of the plurality of different received by the network entity power levels;
determining a transmit power for transmission based on the configuration information of the configured uplink grant by applying the determined transmit power offset, when the determined transmit power with the determined transmit power offset applied is not less than a predefined threshold value, and by not applying the determined transmit power offset, when the determined transmit power with the determined transmit power offset applied is less than the predefined threshold value; and
performing an uplink transmission using the determined transmit power for transmission.

2. The method of claim 1, wherein determining the transmit power offset comprises identifying a transmit power offset included in the received information of an assigned one of the plurality of different received by the network entity power levels for each user equipment for the given transmission instance.

3. The method of claim 1, wherein the transmit power offset is dependent on at least one of a modulation and coding scheme, a transport block size, a spreading factor, and a number of multiplexing codes per user equipment.

4. The method of claim 1, wherein the transmit power offset is dependent on a configured time and frequency resource.

5. The method of claim 4, wherein the configured time and frequency resource is for a grant free uplink transmission, which is shared with one or more other user equipment.

6. The method of claim 1, wherein the transmit power offset is dependent on a transmission time interval length used for the uplink transmission.

7. The method of claim 1, wherein receiving the information of an assigned one of a plurality of different received by a network entity power levels for each user equipment for a given transmission instance includes a sequence of transmit power offsets, where each transmit power offset in the sequence of transmit power offsets is applied sequentially and cyclically on periodically occurring configured transmit resources.

8. The method of claim 7, wherein at least one transmit power offset in the sequence of transmit power offsets is repeated.

9. The method of claim 7, wherein all transmit power offsets in the sequence of transmit power offsets are distinct.

10. The method of claim 7, wherein each transmit power offset in the sequence of transmit power offsets is applied to a respective subset of repetitions of a transport block of the uplink transmission.

11. The method of claim 1, wherein the transmit power offset of the received information is user equipment-specifically signaled by the network entity.

12. The method of claim 1, wherein the transmit power offset of the received information is cell-specifically signaled by the network entity.

13. The method of claim 1, further comprising determining the transmit power offset based on a user equipment group identity with which the user equipment is configured.

14. A user equipment in a communication network, the user equipment comprising:
a controller that determines configuration information for a transmission based on a configured uplink grant; and
a transceiver that receives information of an assigned one of a plurality of different received by a network entity power levels for each user equipment for a given transmission instance; and
wherein a transmit power offset is determined by the controller based on the received information of the assigned one of the plurality of different received by the network entity power levels, and a transmit power for transmission is determined by the controller, based on the configuration information of the configured uplink grant by applying by the controller the determined transmit power offset, when the determined transmit power with the determined transmit power offset applied is not less than a predefined threshold value, and by not applying the determined transmit power offset, when the determined transmit power with the determined transmit power offset applied is less than the predefined threshold value; and
wherein the transceiver performs an uplink transmission based on the determined transmit power for transmission.

15. The user equipment of claim 14, wherein determining the transmit power offset comprises identifying a transmit power offset included in the received information of an assigned one of the plurality of different received by the network entity power levels for each user equipment for the given transmission instance.

16. The user equipment of claim 14, wherein the transmit power offset is dependent on at least one of a modulation and coding scheme, a transport block size, a spreading factor, a number of multiplexing codes per user equipment, and a transmission time interval length used for the uplink transmission.

17. The user equipment of claim 14, wherein the transmit power offset is dependent on a configured time and frequency resource.

18. The user equipment of claim 14, wherein the transmit power offset of the received information is user equipment-specifically signaled by the network entity.

19. The user equipment of claim 14, wherein the information of an assigned one of a plurality of different received by a network entity power levels for each user equipment for a given transmission instance includes a sequence of transmit power offsets, where each transmit power offset in the sequence of transmit power offsets is applied sequentially and cyclically on periodically occurring configured transmit resources.

20. The user equipment of claim 14, further comprising determining the transmit power offset based on a user equipment group identity with which the user equipment is configured.

\* \* \* \* \*